Figure 1:
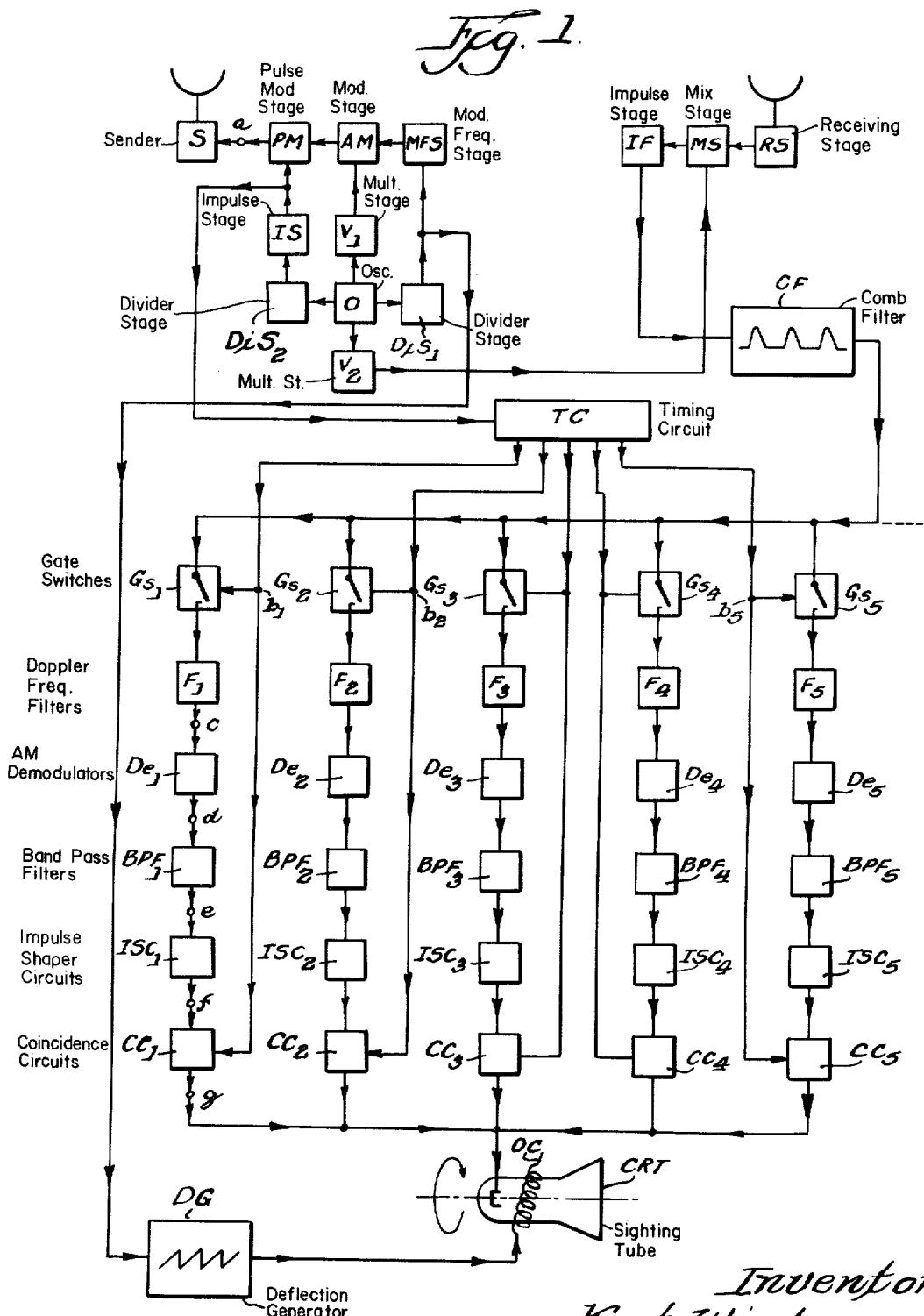

United States Patent [19]
Wiedemann et al.

[11] 3,934,253
[45] Jan. 20, 1976

[54] DOPPLER FREQUENCY RADAR SYSTEM WITH VERY SHORT PULSE MODULATED HIGH FREQUENCY CARRIER WAVES

[75] Inventors: Kurt Wiedemann, Munich; Karl-Ludwig Lenz, Munich-Solln, both of Germany

[73] Assignee: Siemens & Halske Aktiengesellschaft, Berlin & Munich, Germany

[22] Filed: Feb. 10, 1961

[21] Appl. No.: 88,581

[30] Foreign Application Priority Data
Feb. 11, 1960 Germany.............................. 67062

[52] U.S. Cl............................. 343/7.7; 343/13 R
[51] Int. Cl.² ........................................... G01S 9/42
[58] Field of Search............... 343/13 R, 7.7, 8, 9

[56] References Cited
UNITED STATES PATENTS
3,218,553   1/1965   Peterson et al. ............... 343/13 R X Primary Examiner—T. H. Tubbesing
Attorney, Agent, or Firm—Hill, Gross, Simpson, Van Santen, Steadman, Chiara & Simpson

EXEMPLARY CLAIM

1. A doppler frequency radar system, comprising means for generating a high frequency carrier wave, means for amplitude modulating said carrier wave at a relatively low frequency, means for also amplitude modulating such carrier wave to produce short impulses of relatively high pulse sequence frequency, means for radiating said modulated carrier wave toward a moving object, means for receiving such wave as reflected from such a moving object, means for generating accurate timing pulses, means forming a plurality of distance measuring branch circuits, means operatively connected to said timing pulse generating means, and controlled by such pulses, for operatively connecting the receiving means to the respective branch circuits, operative to distribute said received impulses in accordance with the time relation of the received impulses to the timing pulses, means in each branch circuit for demodulating the pulses appearing therein and to form rough distance measuring pulses, means in each branch circuit forming a coincidence circuit and operatively connected to said timing pulse generating means whereby said coincidence circuit is operable to form, responsive to coincident occurrence of the respective rough distance measuring pulses and the timing pulses, fine measuring pulses which assure unequivocal distance indication even in the presence of high pulse sequence frequency.

9 Claims, 4 Drawing Figures

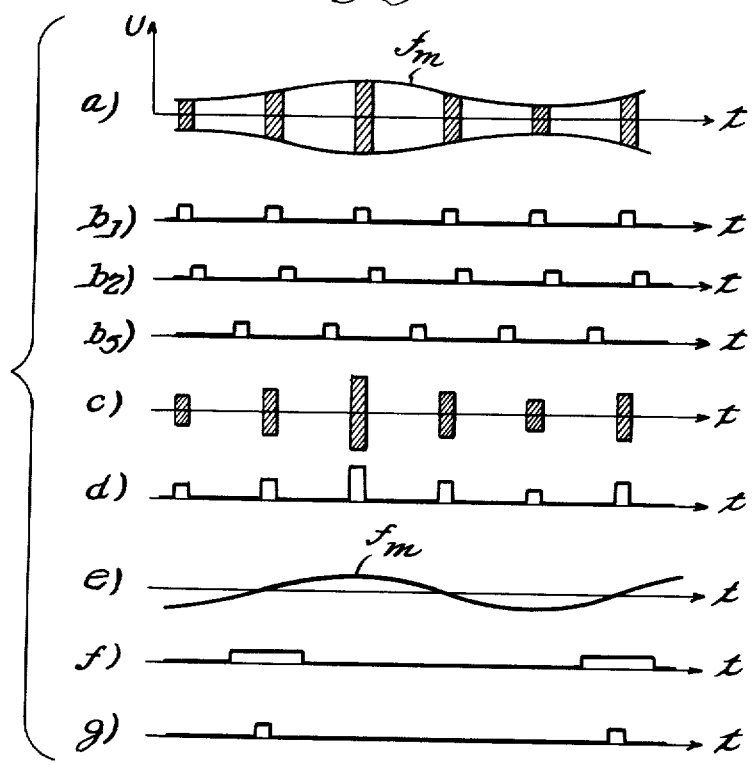
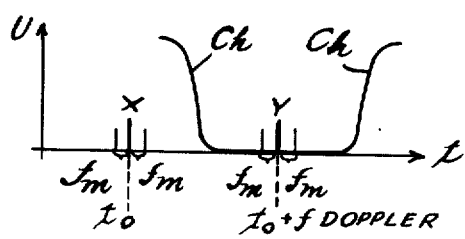
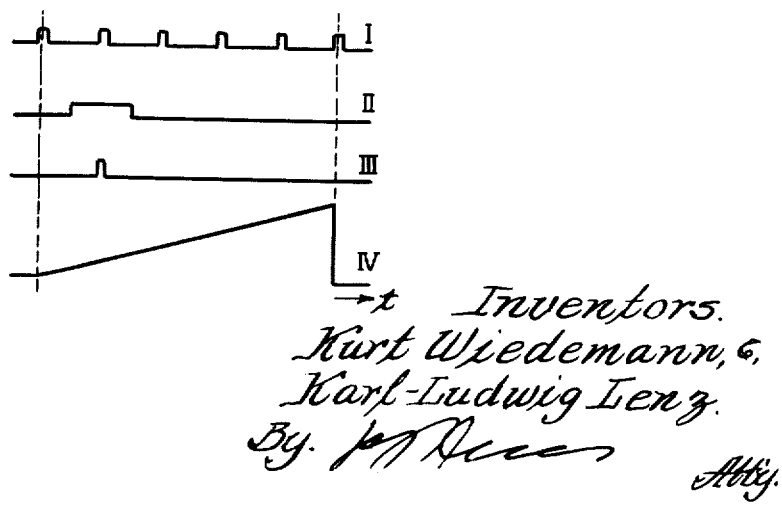

DOPPLER FREQUENCY RADAR SYSTEM WITH VERY SHORT PULSE MODULATED HIGH FREQUENCY CARRIER WAVES

This invention is concerned with doppler frequency radar systems operating with very short pulse modulated high frequency carrier waves.

The doppler frequency radar system utilizes for the differentiation between fixed and moving targets the doppler frequency shift occurring at moving objects. Simple filters and comb filters are known for effecting the separation. The pulse character and therewith the distance information are lost in the case of simple filters, and it has therefore been proposed to use in such case, for the measurement of the pulse running time, separate distance measurement branches which are by means of gate switches successively scanned with sampling pulses. Identical simple doppler frequency filters can thereby be inserted in the individual distance measuring branches.

Difficulties are experienced in connection with the doppler frequency method, owing to the socalled reactive velocities which appear when the doppler frequency is equal to or a multiple of the pulse frequency sequence of the radar apparatus. In order to avoid corresponding influencing of the measurement, it is necessary that the data of the apparatus be selected so that the first reactive velocity appears at the upper limit of the measuring range and as far as possible above the maximum radial speed of the objects to be measured. The reactive velocity can be increased by increasing the wave length of the carrier or of the pulse sequence frequency. The increase of the wave length results in excessively large antennae structures and other drawbacks connected therewith, and it is therefore more advantageous to utilize, with a predetermined carrier wave length which is as short as possible, increase of the pulse sequence frequency. However, the pulse sequence frequency cannot be increased as desired in the case of apparatus with relatively great range and transmitter output, since echos from preceding pulses would return after each transmitted pulse, if the deflection frequency of the radar sighting tube is, as is customary, selected equal to the pulse sequence frequency, resulting in false distance indication. If the deflection frequency of the indicating tube is derived from the pulse sequence frequency by division, there will result a plural indication. Such division shall however be utilized in the present case so as to extend the indicating range beyond the range which can be calculated from the pulse sequency frequency. Accordingly, a pulse sequence frequency which is in view of the first reactive velocity strongly increased, will lead to false indication or to equivocal indication and therewith to uncertain measurement results.

In accordance with the invention, this drawback is avoided by periodic preferably sine shaped amplitude modulation of the pulse modulated sender carrier wave to produce from the modulation frequency, obtained at the receiver by demodulation, rough distance measurement pulses, joining such rough distance measurement pulses in a coincidence circuit with the sampling pulses or with the timing pulses coupled to the modulation frequency, thereby forming, upon coincidence of the rough measurement pulses with the timing pulses, fine measurement pulses which make it possible to obtain unequivocal indication even in the presence of high pulse sequence frequency.

Therefore, according to the principle of the present invention, the distance measurement pulses which are very accurate but lead to a false or equivocal indication, are selected by a second distance information which need not be accurate but must be unequivocal. As a consequence, there will result distance measurement pulses of high accuracy which make it possible to effect always correct and unequivocal measurement.

The advantage obtained thereby is, that the pulse sequence frequency can be considerably increased without any loss as to measurement accuracy and unequivocal indication. The advantage of the high pulse sequence frequency is, that the first reactive velocity is very high and that the further reactive velocities lie above the aircraft speeds which are to interest.

The German Pat. No. 911,663 describes a doppler frequency pulse method in which is effected a distance measurement by periodic frequency alteration at the sender and evaluation of the frequency shift of the received frequency as compared with the sender frequency. Accordingly, the known method operates with frequency modulation, as compared with the present invention which operates with amplitude modulation. It is also known from this patent to determine the distance from the pulse running time as well as from the frequency shift. This is effected by utilizing the pulse running time for the rough measurement while the frequency shift is utilized for the fine measurement. However, this method is unsuitable for operation with increased pulse sequence frequency and likewise unsuitable for avoiding the drawbacks of the indication due to reactive velocities. The known method is moreover unsuitable for suppressing signals of fixed targets and for indicating signals of moving targets when both are located at the same distance.

As compared with this situation, the present invention is despite simultaneous presence of fixed and moving targets adapted to correctly indicate the latter while suppressing the former. The physical foundation for such operation resides in selecting the modulation which effects the unequivocal distance recognition so that (a) frequencies appear in addition to the usual lines of the impulse spectrum, which are based on the modulation and which can be suppressed when the signals are reflected from fixed targets, and (b) permitting in the case of targets moving at sufficient speed, passage through the fixed target-blocking filters, of all lines coming from the modulation, whereby an evaluation for the modulation device, which is disposed after these filters, delivers necessarily only the distance indication with respect to the moving target.

As contrasted with such operation, known methods or systems would fail in the presence, between fixed and moving target, of a distance $$x = n \cdot \frac{1}{2} \cdot c \cdot \frac{1}{f_i},$$

wherein $f_i$ = pulse sequence frequency; $n = 0, 1, 2, 3$; $c$ = velocity of light. In the known systems, the distance indication with respect to the fixed target would be joined with the indication "moving" from an entirely different distance.

The invention will now be described with reference to the accompanying drawings, wherein FIG. 1 shows an example of the circuit of a radar system which is suitable for practicing the present invention;

FIG. 2 shows the time course of the impulse and modulation voltage at different points of the circuit;

FIG. 3 indicates the frequency course of a doppler frequency filter; and

FIG. 4 represents the pulse course at the output of the circuit.

The system comprises a sender and a receiver which advantageously operate, for good uncoupling, with separate rotating radar antennae. A higher carrier frequency in the centimeter or microwave range is produced in the multiplication stage $V_1$ by frequency multiplication of the frequency obtained from a quartz stabilized oscillator O. This carrier frequency is in the amplitude modulation stage AM amplitude modulated preferably with a sine shaped modulation frequency $f_m$ (FIG. 2, line a). This modulation frequency $f_m$ is preferably considerably lower than the pulse sequence frequency, for example, 250 cycles, and is taken from a modulation frequency stage MFS, the frequency of which is likewise derived from the stable oscillator O over a divider stage $DiS_1$. A further divider stage $DiS_2$ is provided for producing from the frequency of the oscillator O, in the impulse stage IS, the pulse sequence frequency which is utilized for impulse-wise modulating the amplitude modulated carrier oscillation in the sampling or pulse modulation stage PM, for transmission over the sender S.

The receiver side comprises a receiver stage RS, followed by a mixing stage MS in which is effected the demodulation with a frequency with differs by the receiver intermediate fequency from the amplitude modulated carrier frequency of the sender. This frequency is derived from the frequency of the oscillator O, for example, over a second multiplier stage $V_2$.

Moving and stationary targets can be differentiated in known manner by means of filters. Comb filters or, in some circumstances, simple filters, are in likewise known manner adapted for this purpose. To give an example, it is assumed in the circuit shown in FIG. 1, that the demodulated received frequency is conducted from the intermediate frequency part to a comb filter CF which blocks out the frequencies of the fixed or stationary target, which are not affected by doppler frequencies, the pulse character of the signals remaining thereby unaffected. A plurality of distance measurement circuits, five in the assumed example, are connected with the comb filter CF. These distance measurement circuits are by means of electronic gate switches $Gs_1...Gs_5$ successively briefly switched in, that is, they are scanned by socalled sampling pulses. An electronic timing circuit TC is employed, which is controlled from the impulse stage IS with the pulse sequence frequency, thus continuously successively placing accurate sampling pulses on the gate switches $Gs_1...Gs_5$, so that the successive switch always closes when the respectively preceding switch is opened. When an impulse is received within the accurately determined time interval in which one of the gate switches is in closed position, such impulse will be extended in the respective distance measurement branch to a simple doppler frequency filter $F_1...F_5$, which blocks out the fixed target.

FIG. 3 shows a filter characteristic Ch (voltage U plotted relative to the frequency f in the IF position) and the position of a fixed target X and that of a moving target Y, each with a spectral line ($f_m$) on each side of the carrier, the spectral lines resulting from the amplitude modulation. Signals arriving from moving targets are passed through the respective filters and produce at the output thereof a continuous frequency which is demodulated in the associated AM demodulator $De_1...De_5$ in order to again obtain the sender modulation frequency $f_m$. The modulation frequency thereupon passes through a bandpass filter $BPF_1...BPF_5$ which is tuned thereto. The phase position of the modulation frequency obtained at this point depends upon the target distance. It is accordingly possible to produce upon zero passage a distance impulse which indicates the target distance more or less roughly by its position as to time. The corresponding impulses are produced in the respective impulse shaper circuits $ISC_1...ISC_5$.

The relatively rough but unequivocal distance measurement pulse is conducted to one input of a coincidence circuit such as $CC_1...CC_5$, to the other input of which are conducted the sampling pulses from the timing circuit TC or other accurate timing pulses. The coincidence circuit delivers an output signal only when a rough distance measuring pulse coincides with an accurate timing pulse. There thus appear at the outputs of the corresponding coincidence circuits exactly accurate distance measuring pulses which are for the bright scanning of the beam conducted to the cathode ray tube CRT in the radar sighting apparatus. The electron beam of the sighting tube is radially deflected under control of a deflection generator DG by means of a deflection coil DC, the deflection coil rotating synchronously with the radar antenna and the deflection device operating synchronously with the modulation frequency $f_m$.

FIG. 2 shows in line a the transmitted amplitude and pulse modulated carrier wave voltage at the point a of the circuit according to FIG. 1. Lines $b_1 - b_2 - b_5$ indicate the sampling pulses from the timing circuit TC as they appear at points $b_1 - b_2...b_5$ or at the respective gate switches $Gs_1...Gs_5$ of the individual receiver measuring circuits. Line c represents the amplitude modulated received pulses which pass at point c of the respective distance measuring circuit, and line d shows these pulses as they appear at point d after demodulation thereof. Line e shows the modulation frequency at the output e of the respective band pass filter such as $BPF_1..BPF_5$, from which is obtained a relatively long rough distance measuring pulse (line f) appearing at the output f of the respective impulse shaping circuits $ISC_1...ISC_5$. At the output g of the respective coincidence circuits such as $CC_1...CC_5$ appears the fine measuring pulse shown in line g of FIG. 2.

FIG. 4 shows in line I the short, accurate, but much too frequent pulses appearing at the inputs of the respective measuring circuits. Line II shows a rough measuring pulse which is formed upon evaluation of the received amplitude modulation frequency $f_m$. Line III shows the pulse course at the outputs of the respective coincidence circuits $CC_1...Cc_5$. It will therefore be apparent that the very accurate unequivocal measuring pulse of the line III has been extracted from the equivocal but accurate pulse series of line I jointly with the unequivocal but less accurate distance measuring pulse of the line II. Line IV of FIG. 4 shows the trigger voltage course at the radar sighting cathode ray tube CRT and the deflection generator DG, respectively.

The invention makes it possible to use, with very short wave lengths in the centimeter or microwave range, pulse sequence frequencies in the order of magnitude of 25 kilocycles and to utilize a considerably lower amplitude modulation frequency $f_m$ of about 250 cycles. In this example, there will result for a carrier wave length of 3 centimeters, at a speed of the target amounting to about 1350 kilometers per hour, a doppler frequency shift of 25 kilocycles. Accordingly, in the case of a pulse sequence frequency of 25 kilocycles, the first reactive velocity will lie at $v = 1350$ kilometers per hour.

The pulses from the modulation voltage at the receiver side may be produced by a circuit which effects release of a pulse upon zero passage of the alternating voltage. Such a circuit is, for example, known as multiar circuit.

The fine measuring pulses which are in the illustrated embodiment derived from the sampling pulses supplied by the timing circuit TC, may be produced differently, for example, by branching off the received signals in back of the respective gate switches $Gs_1...Gs_5$, rectifying the corresponding pulses, and conducting to the respective coincidence circuits the rectified pulses over further gate switches which can be controlled by the sampling pulses from the timing circuit TC. Such a circuit arrangement is particularly reliable since fine measuring pulses can reach the respective coincidence circuits only when reflected signals are received in the corresponding measuring circuit.

Either a single comb filter such as CF or several simple filters such as $F_1...F_5$ can be used in the respective branches for the suppression of signals from fixed targets. The best suppression of signals from fixed targets is of course obtained by the use of the comb filter jointly with the simple filters, as shown in FIG. 1. A comb filter disposed ahead of the simple filters results in the particular advantage that the gate switches $Gs_1...Gs_5$ need not switch either the high amplitudes of the signals from the fixed targets or the low amplitudes of the signals from moving targets.

Changes may be made within the scope and spirit of the appended claims which define what is believed to be new and desired to have protected by letters Patent.

We claim:

1. A doppler frequency radar system, comprising means for generating a high frequency carrier wave, means for amplitude modulating said carrier wave at a relatively low frequency, means for also amplitude modulating such carrier wave to produce short impulses of relatively high pulse sequence frequency, means for radiating said modulated carrier wave toward a moving object, means for receiving such wave as reflected from such a moving object, means for generating accurate timing pulses, means forming a plurality of distance measuring branch circuits, means operatively connected to said timing pulse generating means, and controlled by such pulses, for operatively connecting the receiving means to the respective branch circuits, operative to distribute said received impulses in accordance with the time relation of the received impulses to the timing pulses, means in each branch circuit for demodulating the pulses appearing therein and to form rough distance measuring pulses, means in each branch circuit forming a coincidence circuit and operatively connected to said timing pulse generating means whereby said coincidence circuit is operable to form, responsive to coincident occurrence of the respective rough distance measuring pulses and the timing pulses fine measuring pulses which assure unequivocal distance indication even in the presence of high pulse sequence frequency.

2. A system according to claim 1, comprising a radar sighting device and means for supplying deflection pulses thereto, the deflection frequency of which is equal to the modulation frequency, the latter being lower than the pulse sequence frequency, so as to extend the indicating range beyond the range which may be calculated from the pulse sequence frequency.

3. A system according to claim 1, wherein said branch circuits each include for the evaluation of the modulation frequency a circuit of the multiar type which produces upon zero passage of the modulation voltage rough distance measuring pulses the lateral position of which depends upon the target distance.

4. A doppler frequency radar system, comprising means for generating a high frequency carrier wave, means for amplitude modulating said wave to form impulses at a relatively high pulse sequence frequency, and means for also amplitude modulating such wave at a relatively low frequency, means for radiating said modulated wave toward a moving object, means for receiving said wave as reflected from such a moving object, means for demodulating the received wave to produce rough but unequivocal distance measuring pulses, means for generating accurate timing pulses at the pulse modulation frequency, means for comparing said timing pulses with said rough distance measuring pulses for coincidence, and means for forming responsive to coincident occurrence of the respective rough distance measuring pulses and the timing pulses, fine measuring pulses which assure unequivocal distance indication even in the presence of high pulse sequence frequency.

5. A system according to claim 4, wherein said means for producing rough distance measuring pulses is constructed to produce rough distance measuring pulses which are of a duration to embrace the respectively cooperating timing pulse, but shorter than would be required to simultaneously embrace two timing pulses.

6. A system according to claim 4, wherein said means for modulating at the pulse sequence frequency is constructed, with a carrier wave length as short as possible within the centimeter or microwave range, to produce a pulse sequence frequency which is so high, for example 25 kilocycles, that the first reactive velocity appears at the upper limit of the measuring range and especially above the maximum radial velocity of the object to be measured.

7. A system according to claim 4, wherein the frequency of said low frequency amplitude modulating means is constructed to modulate at a frequency considerably lower than the pulse sequence frequency.

8. A dopper frequency radar system, comprising means for generating a high frequency carrier wave, means for amplitude modulating said wave to form impulses at a relatively high pulse sequence frequency, and also means for amplitude modulating such wave at a relatively low frequency, means for radiating said modulated wave toward a moving object, means for receiving said wave as reflected from such a moving object and any waves reflected from stationary objects, means for blocking out any waves reflected from stationary objects, means for generating accurate timing pulses at the pulse frequency, means for segregating the respective received pulses as to time, means for demodulating a segregated series of pulses to produce rough but unequivocal distance measuring pulses, means for comparing respective timing pulses with said rough distance measuring pulses for coincidence, and means for forming responsive to coincident occurrence of the respective rough distance measuring pulses and the timing pulses, fine measuring pulses which assure unequivocal distance indication even in the presence of high pulse sequence frequency.

9. A system according to claim 8, wherein said means for producing rough distance measuring pulses is constructed to produce rough distance measuring pulses which are of a duration to embrace the respectively cooperating timing pulse, but shorter than would be required to simultaneously embrace two timing pulses.

* * * * *